March 7, 1939.   F. KRONER   2,149,780
DISPLAY DEVICE
Filed Aug. 28, 1937   2 Sheets-Sheet 1
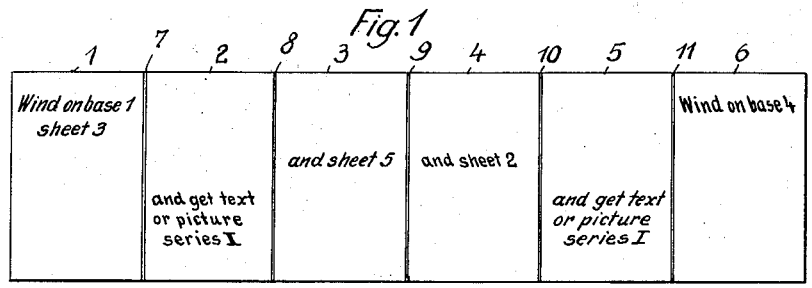
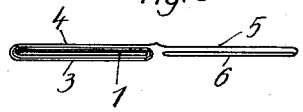 
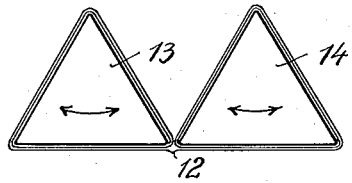
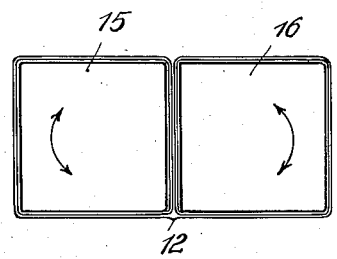
Inventor:
Friedrich Kroner March 7, 1939.  F. KRONER  2,149,780
DISPLAY DEVICE
Filed Aug. 28, 1937   2 Sheets-Sheet 2

Inventor:
Friedrich Kroner,

Patented Mar. 7, 1939

2,149,780

UNITED STATES PATENT OFFICE 2,149,780

DISPLAY DEVICE

Friedrich Kroner, Berlin-Charlottenburg, Germany, assignor to Transart Aktiebolag, Goteborg, Sweden, a Swedish company Application August 28, 1937, Serial No. 161,439
In Germany August 29, 1936

6 Claims. (Cl. 40—102)

My invention relates to a display device to be used for various purposes, including educational, advertising and like purposes.

It is an object of this invention to produce by means of a thin, preferably transparent web or strip carrying a plurality of interrelated representations, such as images and/or text, a variety of composite representations on an opaque background.

Another object of this invention is to render it possible in a simple manner to superpose the interrelated images and/or text one upon the other, to obtain the different composite representations.

According to the present invention, the various composite representations are produced by the folding together or the winding up of the image bearing strip or web, with or without the use of a solid opaque base member, in such a manner that the several interrelated representations become superposed thus forming different composite representations depending on the way in which the strip or web is folded or wound up.

The invention will be better understood from the following description with reference to the accompanying drawings, showing by way of example and schematically some embodiments of the invention, and in which—

Figure 1 is a plan view of an image bearing strip or web having at each end a base member;

Figure 2 is a side view of Figure 1;

Figure 3 is a side view of the strip or web shown in Figures 1 and 2, wound up on the left hand base member;

Figure 4 is a side view of the strip or web shown in Figures 1 and 2, wound up half on the left hand and half on the right hand base member;

Figure 5 is a side view of another embodiment, comprising a thin transparent or opaque silhouette strip or web and two base or core members of triangular prismatic shape;

Figure 6 is an embodiment showing prismatic base or core members of square cross-section;

Figure 7:
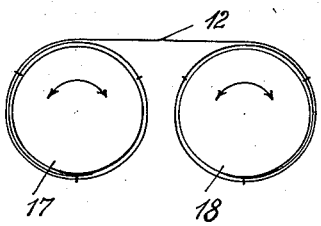
Figure 7 is an embodiment showing base or core members of cylindrical shape.

First, from Figs. 1 to 4 it will be seen that the strip or web comprises a plurality of image sections 1, 2, 3, 4, 5, 6. Each image section carries graphic representations, such as images and/or text, and the several image or text bearing sections 1 to 6 are so interrelated as to form different composite representations when superposed. The superposition may be effected by the strip or web being folded together along the folds indicated at 7, 8, 9, 10, 11 in various ways, but preferably the sections 2, 3, etc. are wound on either of the two end sections or base members 1 or 6. Therefore, these end sections or base members 1 and 6 are preferably applied to, or formed by, a solid section, such as cardboard.

It will be seen that if the image bearing sections 2 to 5 are wound on the base or core member 1 so that the sections 2 and 4 come to lie underneath said base member 1 and the sections 3 and 5 come to lie on top of the same, a composite text or picture series I is formed reading in this instance: "Wind on base 1 sheet 3 and sheet 5 and get text or picture series I". On the other hand, if the sections 5, 4, 3, 2 are wound on the other base member 6 in such a manner that the sections 5 and 3 come to lie underneath, and the sections 4 and 2 on top of, base member 6, another composite text series II will result reading in this instance: "Wind on base 6 sheet 4 and sheet 2 and get text or picture series II".

According to Figure 5 the image bearing strip or web 12 can be wound on either of two prisms of triangular cross-section 13, 14 to which the two ends of the strip or web 12 are attached. Figure 6 shows two square shaped base members 15, 16, the arrangement being for the rest the same as described with reference to Figure 5.

By holding side by side the two base members such as 1 and 6 in Figure 1 or 13 and 14 in Figure 5 or 15 and 16 in Figure 6, representations may be formed extending over both base members.

According to Figure 7 the strip 12 can be wound on either of two cylindrical base or core members 17, 18. It will of course be understood that in this instance the length of the image bearing sections corresponding to the image bearing sections in Figures 1 and 2 has to be so chosen that two, three or more pictures cover 360° of the circumference of the cylinder being superposed thereon.

Figure 8:
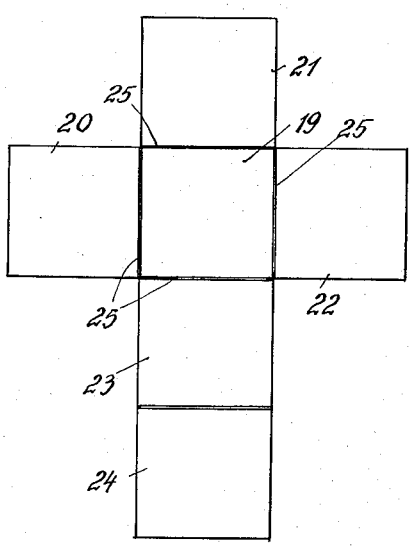
Figure 8 is a plan view of a strip or web comprising a square shaped middle section and lateral sections.

According to Figure 8 a middle section 19 of an image bearing strip or web is provided with lateral sections 20, 21, 22, 23, 24. The lateral sections are preferably separated by folds 25 from the middle section. It will be understood that by the folding of the lateral sections onto the middle section 19, a great number of different composite pictures can be formed corresponding to the number of possibilities of superposing the several sections one upon the other. It will be noted that each of the sections 20, 21, 22, 23 can be provided with one or more additional "appendices" 24 thus multiplying the number of possibilities of folding the sections together.

Figure 9:
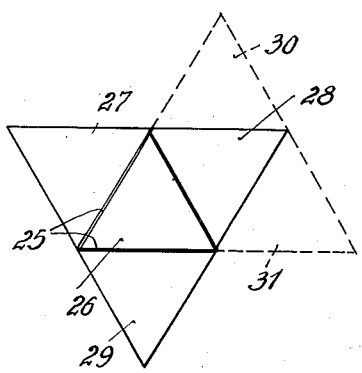
Figure 9 is a plan view of a strip or web comprising a triangular middle section and triangular lateral sections.

The arrangement shown in Figure 9 corresponds to that shown in Figure 8 except that the middle section 26 in Fig. 9 and the lateral sections 27, 28, 29 are of triangular shape and the lateral section 28 is provided with additional sections 30 and 31. It will be seen that there are various possibilities of superposing the several sections.

Practically, I contemplate applying the middle section 19 (Fig. 8) or 26 (Fig. 9) to a base of solid opaque material, or to make this section itself entirely of such a material in order to facilitate the folding operation, to render the device more stable and to provide an opaque background.

Figure 10:
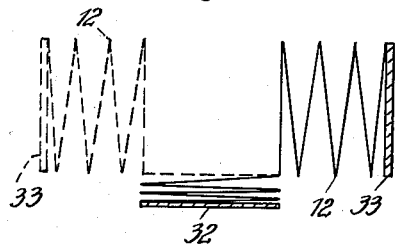
Figure 10 is a side view of a strip or web adapted to be folded together Leporello or zig-zag fashion.

According to Figure 10, the image bearing strip or web 12 is folded together Leporello or zig-zag fashion in such a manner that the free end of the strip or web is held with the hand on the right (solid lines) or on the left (dotted lines) of the sections of the strip or web which are already superposed. Solid base members 32 and 33 may or may not be provided.

The image bearing strip or web may be transparent consisting of the material known by the trade-mark "Cellophane" which consists of cellulose hydrate, or the like. The graphic representations are in this case preferably applied to the material by being printed thereon, preferably with the use of opaque colours. However, also, transparent colours may be used, especially for the upper layers, for instance in order to obtain composite colours such as green by the superposition of a yellow and a blue picture. It is also possible by the selection of suitable colours to cause the lower picture to disappear by the superposition of the upper picture.

Furthermore, I contemplate within the scope of my invention to use opaque strips or webs cut out by stamping or otherwise at the sections which are intended to be transparent, so as to form silhouette pictures. Also, I may use transparent and opaque materials in combination to get particular effects.

The surfaces of the solid base member may or may not be provided with component representations and may consist of card-board, heavier sheets of Cellophane, or hollow bodies. Also stampings or other perforations may be provided in the base members. The thin strips or webs may be displaceable or interchangeable with respect to the base members in the manner known per se. The thin strips or webs proper may be composed of different materials to obtain particular effects.

It will be understood that the device according to this invention is particularly adapted to produce a series of pictures showing an organic development, such as a fairy-tale, a biological process, or any other process of conversion or the like.

I claim:

1. The combination with a prismatic base member, of a thin at least partly transparent strip or web comprising a plurality of successive image bearing sections containing interrelated graphic representations, said strip or web being adapted to be wound on said base member so as to form different composite graphic representations by the various image bearing sections of the strip or web being wound up and superposed on said base member.

2. The combination with a base member, of a strip or web of at least partly transparent material comprising a plurality of successive image bearing sections having each the size of said base member and containing interrelated graphic representations, said strip or web being adapted to be wound on said base member so as to form different composite graphic representations by the various image bearing sections of the strip or web being wound up and superposed on said base member.

3. The combination with a base member showing at least one graphic representation of a strip or web of at least partly transparent material comprising image bearing sections containing additional subject matter whereby the graphic representation of said base member is modified as said strip is wound on said base member, the base representation being visible through the additional wound up transparent layers.

4. A strip of at least partly transparent material comprising graphic representations and transverse folds adapted to permit the image bearing sections between the folds to be superposed in such a manner that the graphic representations appearing thereon form different composite representations.

5. The combination with a strip or web of at least partly transparent material being divided by folds into a plurality of substantially equal rectangular sections comprising interrelated graphic representations, of two solid sheets of substantially equal size one at each end of said strip or web and adapted to permit said strip or web to be wound or unwound onto or from either of said solid sheets, whereby the several sections of said strip or web are superposed so as to form different composite graphic representations.

6. The combination with a strip or web of at least partly opaque material being divided by folds into a plurality of substantially equal rectangular sections comprising interrelated silhouette representations, of two solid sheets of substantially equal size one at each end of said strip or web and adapted to permit said strip or web to be wound or unwound from said solid sheets, whereby the several sections of said strip or web are superposed so as to form different composite silhouette representations.

FRIEDRICH KRONER.